Feb. 21, 1939.　　　G. A. LYON　　　2,148,213
WHEEL DISK
Filed May 9, 1936
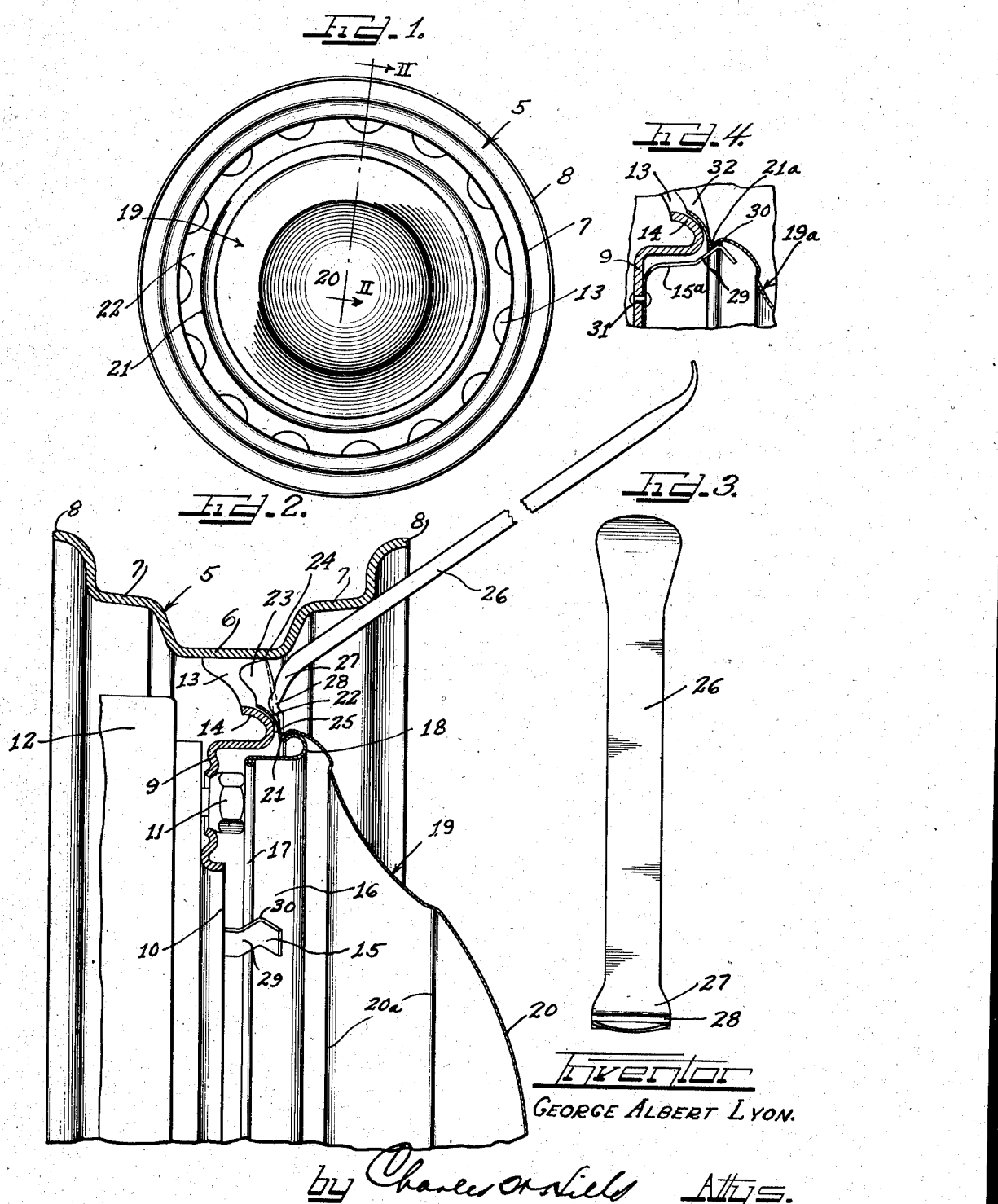
Inventor
GEORGE ALBERT LYON.
by Charles O'Neil
Attys.

Patented Feb. 21, 1939

2,148,213

UNITED STATES PATENT OFFICE 2,148,213

WHEEL DISK

George Albert Lyon, Allenhurst, N. J.

Application May 9, 1936, Serial No. 78,795

11 Claims. (Cl. 301—37)

This invention relates to improvements in wheel disks for disposition over the outer side surfaces of vehicle wheels, to protect the inside parts of the wheel and enhance the appearance of the vehicle as a whole, although the invention may have other uses and purposes as will be apparent to one skilled in the art.

In the past, it has frequently been the practice to provide a hub cap or a wheel disk with a relatively heavy core or inside part and an outside shell overlying this inside part made of light thin material, for example, such as brass. During the course of travel of a vehicle, stones, pebbles and the like are frequently thrown with considerable force against the wheel disk with the result that a light shell will be dinged, nicked or peeled off the inner core shell. This is sometimes true even though the disk is of a single thickness of relatively heavy material.

With the foregoing in mind, it is an object of the present invention to provide a wheel disk, of which the major portion is a single thickness of relatively strong material maintained under a stretching tension in the manner of a drum head so that the disk will be better able to repel sudden shocks, and objects flung thereagainst will rebound with little or no injury to the disk.

It is also an object of the present invention to provide a wheel disk having an inner annular flange part for engaging retaining means carried by a wheel, and an outer shell stretched over and clinched around the inner part to maintain a stretching tension in the outer shell in the manner of a drum head.

Another object of this invention is the provision of a wheel disk as above set forth, made of stainless steel.

Difficulty has also been experienced in the past in providing a wheel disk for snap-on and pry-off engagement with a vehicle wheel which was not subject to a rattling, drumming or similar noise when on the vehicle and the vehicle is in motion.

Another object of the present invention is the provision of a wheel disk carrying means for engagement with retaining elements on the wheel, and extending outwardly beyond these means in a manner to provide only outer edge contact with the wheel, the remainder of the disk being spaced from the wheel so that a strain will be imposed on the disk when in engagement with the wheel due to the edge contact.

A further object of this invention is the provision of a wheel disk having the outer portion thereof shaped in keeping with the spoked portion of a wheel, but also shaped so that only the outer edge of the shaped portion contacts the wheel, the spoke formations being in spaced relationship to the similar formations on the wheel.

Still another object of this invention is the provision of a wheel disk having an outer shell portion stretched and clinched over an inner annular fastening flange in a manner to provide an undercut groove engageable by a pry-off tool to remove the disk from the wheel, the inner portion of the disk being maintained under a stretching tension by means of its clinched engagement with the flange.

A further feature of the invention resides in the provision of a disk of the character just above set forth in which the outer shell is continued beyond the undercut groove and shaped in keeping with the spoked portion of a wheel, but also shaped so as to provide only edge contact with the spoked portion of the wheel.

In general, the present invention includes a wheel disk for a snap-on and pry-off engagement with a vehicle wheel, the disk covering substantially the entire outer side surface of a vehicle wheel, and eliminating the need of the usual hub cap. The disk includes an inner annular flange portion having a rolled inner edge and a rolled outer edge, the inner edge being for engagement with resilient spring retaining elements projecting substantially in an axial direction from the body part of the vehicle wheel. An outer shell, preferably of stainless steel, having a bulged central part in simulation of a hub cap, is stretched and clinched over the outer rolled edge of the fastening flange or inner part, thus uniting these parts and maintaining the stretching tension in the outer shell in the manner of a drum head. The clinching is done in such a manner as to provide an undercut groove engageable by a pry-off tool which may be fulcrumed against the rim of the wheel to remove the disk from the wheel. In the illustrated embodiment of this invention, the outer portion of the outer shell which extends beyond the aforesaid groove is shaped in keeping with a spoked or spoke-simulated part of the wheel. This part of the disk is further shaped so that it will provide only edge contact with the wheel. In other words, the outer edges only of the simulated spokes contact the corresponding parts of the wheel, but the remainder of this portion of the disk, while having its spokes spoke-shaped, is slightly spaced from the corresponding part of the wheel. Therefore, when the disk is snapped into position upon the wheel, with the retaining elements on the wheel engaged with the fastening flange of the disk, the outer part of the disk will be subjected to a tension due to the edge contact with the wheel, and rattling, drumming and similar noises will be so eliminated.

The invention also contemplates the provision of a wheel disk comprising only a single piece of material and shaped for engagement with the spring retaining means carried by the wheel. In this instance, it may be necessary to provide the wheel with longer spring retaining elements than are used for a disk having a separate fastening flange attached thereto.

Other and further objects and advantages of the present invention will be apparent from the disclosures hereinafter, taken in connection with the accompanying drawing, in which:

Figure 1 is an outer side elevational view of a vehicle wheel, minus the tire, equipped with a wheel disk embodying principles of the present invention;

Figure 2 is an enlarged fragmentary sectional view, with parts in elevation, taken substantially as indicated by the line II—II of Figure 1, looking in the direction of the arrows, and showing the use of a tool for removing the disk from the wheel;

Figure 3 is an elevational view of the tool itself; and

Figure 4 is a fragmentary sectional view, with parts in elevation, illustrating a disk of different construction associated with a wheel.

As shown on the drawing:

In the illustrated embodiment of the present invention, there is shown a vehicle wheel including a drop center tire rim generally indicated by numeral 5 and comprising a base flange 6, intermediate flanges 7—7, and side edges 8—8, all integrally connected in the usual manner. The wheel also includes a body part 9 centrally apertured as at 10 to define a hub opening for the wheel and apertured at spaced intervals to accommodate securing means, such as bolts 11, by means of which the wheel may be attached to a vehicle part, such as the brake drum 12 or to a spare wheel carrier, as the case may be. Outside the fastening bolt circle, the wheel is provided with spaced indented portions 14 at regular intervals to simulate spokes, there being an aperture 13 between each pair of spoke-like formations. The body part of the wheel also carries a plurality of resilient retaining elements 15 for a snap-on engagement with the disk to hold the disk upon the wheel.

The disk itself embodies an annular ring-like fastening flange 16 having an inwardly turned edge 17 for engagement with the retaining means 15 carried by the wheel, and an outwardly turned outer edge 18 to aid in establishing connection with the disk proper or outer shell.

The disk proper includes an outer shell, preferably made of stainless steel, generally indicated by numeral 19. The central portion of the disk is dome-shaped, as indicated at 20, to enhance the appearance of the disk and in many instances simulate a hub cap of much less size than the disk itself. The disk is attached to the fastening flange 16 by being clinched around the turned edge 18, as indicated at 21. The clinching operation provides an undercut groove formation on the outside of the disk for a purpose that will later appear. Between the clinched part 21 and the central dome portion 20, the disk may be given any desirable shape, preferably with one or more ribs 20a therein, for the purpose of strengthening and rigidifying the disk.

It is to be noted that the clinching operation uniting the disk proper with the fastening flange 16 is performed in such a manner as to establish and maintain a stretching tension in the body part of the disk. Some of this tension is provided in the disk at the time it is formed and at the time of the forming of the ribs 20a, which also aid in maintaining the tension. However, the disk is stretched over the turned edge 18 of the fastening flange and clinched therearound and thereunder so that the disk is stretched in the manner of a drum head and is thus enabled to readily repel stones, pebbles and other objects which may be flung against the disk, these objects rebounding from the surface of the disk with little or no injury to the disk.

Consequently, a disk of such structure, especially if made of stainless steel, is less susceptible to mars, dinges and similar injuries than is a disk made of relatively soft metal, such as brass, overlying the central core. In addition, the present disk being of a single thickness of material, the strength of which is enhanced by the construction of the disk, cannot peel and is substantially impregnable to cracking or breaking, at least in ordinary usage.

Outside the clinch groove 21, the disk is provided with an integral apron or flange part 22 in simulation of spokes with inturned side edges defining apertures akin to spaces between the spokes, as indicated at 23. This part of the disk is designed to overlie the spoked portion of the wheel, but with reference to Figure 2, it will be noted that the disk is arched along a different radius from the axial direction than the corresponding part of the wheel. Therefore, the part 22 will contact the wheel only at the outer edges of the spoke portions thereof, there being a space 25 between the rest of the part 22 and the spokes of the wheel. Accordingly, when the disk is in place on the wheel with the fastening flange 16 held by the retaining elements 15, the disk contacts the wheel at the outer edge thereof as indicated at 24, and the outer portion 22 of the disk is thus placed under a tension tending to eliminate rattling, drumming and similar noises when the vehicle is in use.

This, taken in conjunction with the tensioned body part of the disk, provides an extremely durable disk construction of such light weight as to add little to the overall weight of the vehicle without the disks, and as to reduce the gas consumption.

In order to remove the disk from the wheel, a simple pry-off tool may be used, this tool being best illustrated in Figure 3. The tool comprises a shank 26 having a splayed end 27 provided with a transverse groove 28 and terminating in a relatively sharp edge for easy application. The tool is positioned in the manner seen in Figure 2, with the edge thereof in the undercut groove 21, and a portion of the tool may then be fulcrumed against the rim, in this instance between the intermediate flange 7 and the side edge 8, to very easily pry the disk off the wheel.

In the illustrated instance, the disk is substantially snapped on and may be pried off with a snap action, in view of the structure of the retaining elements 15, each of which is provided with an inclined engaging part 29 disposed behind a retaining shoulder 30. As seen best in Figure 4, these retaining elements may be substantially L-shaped with one leg of the L disposed against the body part 9 of the wheel and secured thereto in any suitable manner, such as by rivets 31, so that the other leg of the L will extend substantially in an axial direction relatively to the wheel.

In Figure 4, I have shown a slightly modified form of construction including the same form of wheel construction, with the exception that the retaining elements 15a, attached thereto, may be made a trifle longer than the retaining elements shown in Figure 2. In other words, these retaining elements may extend sufficiently far from the body part of the vehicle as the exigencies of circumstances may require. In this instance, the disk is not provided with an initially separate fastening flange, but the disk 19a is provided with an undercut groove 21a which is directly engaged by the retaining elements on the inner side thereof to hold the disk in position upon the wheel. In this instance, also, the outer portion 32 of the disk may be of the same nature as that seen in Figures 1 and 2, numbered 22. In either event, it preferably contacts the wheel only at the outer edge thereof so as to be subject to the tension above described when applied to the wheel.

The disk structure illustrated in Figure 4 also possesses a considerable amount of the drum head characteristics of the above described disk 19. In the formation of the disk, especially the body part thereof, a tension is set up in the metal, which tension is maintained to some extent by the ribs 20a and which tension is enhanced by the forming of the undercut groove 21a. The rather sharp angle of this groove and its undercut characteristics will maintain the body portion of the disk under tension to a material degree so that the disk 19a will possess most of the beneficial characteristics hereinabove explained in connection with the disk 19.

It will be noted that the disk 19a is also somewhat lighter than the disk 19 because it does not incorporate an initially separate fastening flange and therefore will result in the vehicle consuming even less fuel than with the disk 19.

From the foregoing, it is apparent that I have provided a novel wheel disk which is very light in weight, thus tending to lessen the fuel consumption of the vehicle, which is extremely durable, less likely to be injured by objects thrown thereagainst, and which is attached to a wheel in a manner tending to eliminate rattling, drumming and similar noises. It will further be noted that the disk is simple in construction and may be economically manufactured.

I claim as my invention:

1. In combination, a vehicle wheel having a body part of which the outer portion is shaped in simulation of a spoked wheel and which body part also carries resilient retaining means to hold a disk on the wheel, and a disk to overlie the outer side surface of the wheel, said disk including an outer shell and an inwardly extending flange around which the outer shell is clinched to hold the flange in position for engagement with said retaining means, and said outer shell being formed outside said flange in keeping with the spoked portion of the wheel but such as to lie spaced from said spoked portion except for an outer edge contact therewith.

2. As an article of manufacture, a disk for disposition over the outer side surface of a vehicle wheel, including a flange part for snap-on engagement with disk retaining means carried by the wheel, and an outer shell fastened over and beneath a part of said flange to unite the parts, said outer shell having the stock thereof stretched and maintained under tension thereby.

3. As an article of manufacture, a disk for disposition over the outer side surface of a vehicle wheel, including an inside part and an outside part, said outside part being clinched over the inside part and the stock of the outside part being stretched and tensioned thereby.

4. As an article of manufacture, a wheel disk for disposition over the outer side surface of a vehicle wheel, including an inner hoop-shaped part and an outer shell part and having a depressed annular intermediate portion between the outer edge and the center of the disk, the stock of said shell part being stretched and clinched along said intermediate annular portion of said shell part over the inner part to unite the parts and maintain the portion of said shell part inwardly of said intermediate annular portion under tension.

5. As an article of manufacture, a wheel disk for disposition over the outer side surface of a vehicle wheel, including a stainless steel shell centrally bulged and having a depressed annular intermediate portion between the outer edge and the center of the disk, and an annular inner flange part, the centrally bulged portion of the stock of said shell being under a stretching tension, and said shell being clinched along said intermediate annular portion around said inner part to maintain such tension.

6. As an article of manufacture, a wheel disk for disposition over the outer side surface of a vehicle wheel, including an inner annular part and an outer shell part having a depressed annular intermediate zone between the outer edge and the center of this disk, said shell part being stretched and clinched at said intermediate annular zone over the inner part.

7. As an article of manufacture, a wheel disk for disposition over the outer side surface of a vehicle wheel, including an inner flange part for engagement with retaining means carried by the wheel, and an outer shell part clinched over said inner part in a manner to form an undercut groove and to maintain a stretching tension in said outer shell, and said shell extending beyond said groove towards the rim of the wheel, the structure being such that a pry-off tool may be engaged in said groove and fulcrumed on the rim of the wheel to remove the disk.

8. As an article of manufacture, a wheel disk for disposition over the outer side surface of a vehicle wheel, including an inner flange part for engagement with retaining means carried by the wheel, and an outer shell part clinched over said inner part in a manner to maintain said outer shell under a stretching tension, and said shell extending radially outward beyond said inner part and having its outer margin serrated and shaped in keeping with a spoked part of the wheel.

9. As an article of manufacture, a wheel disk for disposition over the outer side surface of a vehicle wheel, including an inner flange part for engagement with retaining means carried by the wheel, and an outer shell part clinched over said inner part in a manner to maintain said outer shell under a stretching tension, and said shell extending radially outward beyond said inner part and having its outer margin serrated and shaped in keeping with a spoked part of the wheel, said outwardly extending part being also shaped to contact the wheel only at the outer edges of the spoke-like projections.

10. In combination, a wheel, a snap-on wheel disk for disposition over an outer side of a wheel, said wheel including a rim and a body portion having disk-retaining spring elements connected thereto, said disk comprising a central crown portion and a relatively narrow spoke covering portion, at the junction of which portions is a radially inwardly inclined underturned outer edge formed to define a sufficiently deep groove between said body and spoke portions for the reception of the end of a pry-off tool, and so disposed as to be sufficiently close to the rim that a part of the rim may be used as the fulcrum of the tool, the inner side of said disk at said groove being provided with an inturned edge formed to slide easily over free ends of the retaining elements as the disk is applied to and removed from the wheel.

11. In combination, a wheel, a snap-on wheel disk for disposition over an outer side of a wheel, said wheel including a rim and a body portion having disk-retaining spring elements connected thereto, said disk comprising a central crown portion and a relatively narrow spoke covering portion, at the junction of which portions is a radially inwardly inclined underturned outer edge formed to define a sufficiently deep groove between said body and spoke portions for the reception of the end of a pry-off tool, and so disposed as to be sufficiently close to the rim that a part of the rim may be used as the fulcrum of the tool, the inner side of said disk at said groove being provided with an inturned relatively sharp edge formed to slide downwardly over inclined ends of and under retaining shoulders of the spring elements.

GEORGE ALBERT LYON.